(12) United States Patent
Dodt, Jr.

(10) Patent No.: US 8,071,184 B1
(45) Date of Patent: Dec. 6, 2011

(54) HOOD ORNAMENT

(76) Inventor: James W. Dodt, Jr., Phoenix, AZ (US)

( * ) Notice: Subject to any disclaimer, the term of this patent is extended or adjusted under 35 U.S.C. 154(b) by 0 days.

(21) Appl. No.: 12/817,701

(22) Filed: Jun. 17, 2010

Related U.S. Application Data

(60) Provisional application No. 61/296,649, filed on Jan. 20, 2010.

(51) Int. Cl.
*B60R 13/00* (2006.01)
(52) U.S. Cl. ............. 428/31; 40/591; 280/727; 280/762
(58) Field of Classification Search ............... 428/31; D12/197; 40/413, 591; 280/727, 762
See application file for complete search history.

(56) References Cited

U.S. PATENT DOCUMENTS

| | | | | |
|---|---|---|---|---|
| 2,553,963 A * | 5/1951 | Dzus | .............. | 33/264 |
| 2,559,761 A * | 7/1951 | Fulton | .............. | 33/264 |
| D242,786 S * | 12/1976 | McAvin | .............. | D12/199 |
| 4,349,591 A * | 9/1982 | Kanamori | .............. | 428/31 |
| 4,400,417 A * | 8/1983 | Kanamori et al. | .............. | 428/31 |
| 4,560,597 A * | 12/1985 | Kanamori | .............. | 428/31 |
| 4,788,550 A * | 11/1988 | Chadima, Jr. | .............. | 428/31 |
| 4,988,065 A * | 1/1991 | Leban et al. | .............. | 248/181.1 |
| 5,052,714 A * | 10/1991 | Muscat et al. | .............. | 280/762 |
| 5,316,808 A * | 5/1994 | Prunty | .............. | 428/31 |
| 5,376,415 A * | 12/1994 | Calabro | .............. | 428/31 |
| 5,456,958 A * | 10/1995 | Crisler | .............. | 428/31 |
| 6,106,912 A * | 8/2000 | Balog | .............. | 428/31 |

* cited by examiner

*Primary Examiner* — Aaron Austin
(74) *Attorney, Agent, or Firm* — Kenneth L. Tolar

(57) ABSTRACT

A hood ornament includes a circular base plate having a bolt extending from the lower surface that is inserted through a hole formed in the vehicle hood; a locking nut is attached to the bolt to tightly anchor the base plate to the hood. An ornament member includes a sight mounted on a foundation having a key latch depending therefrom that releasably seats within a keyed receptacle formed in the base plate. The foundation includes an oblique lower surface to assure that the sight extends at a discrete angle relative to the base plate when the ornament is secured thereto. Accordingly, if the base plate is mounted on a downwardly-sloped surface, the sight will be substantially vertical.

3 Claims, 1 Drawing Sheet

HOOD ORNAMENT

CROSS REFERENCE TO RELATED APPLICATIONS

This application is entitled to the benefit of provisional application No. 61/296,649 filed on Jan. 20, 2010, the specification of which is incorporated herein by reference.

BACKGROUND OF THE INVENTION

The present invention relates to a hood ornament that assists a driver with more accurately gauging the length of a vehicle's front end.

DESCRIPTION OF THE PRIOR ART

Many newer vehicles have downwardly-sloped hoods to minimize wind drag. Because the driver may be unable to see the front end of the vehicle, he or she cannot accurately gauge its length thereby increasing the likelihood of collisions with other objects. Accordingly, there is currently a need for a device that assists a driver with maneuvering a vehicle having a downwardly-sloped front end. The present invention addresses this need by providing a hood ornament having a base with a removable sight obliquely extending therefrom; accordingly, when the ornament is mounted immediately adjacent to the front end of an angled hood, the sight is substantially vertical allowing a driver to more safely maneuver the front end of the vehicle.

SUMMARY OF THE INVENTION

The present invention relates to a hood ornament comprising a circular base plate having a bolt extending from the lower surface that is inserted through a hole formed in the vehicle hood; a locking nut is attached to the bolt to tightly anchor the base plate to the hood. An ornament member includes a sight mounted on a foundation having a key latch depending therefrom that releasably seats within a keyed receptacle formed in the base plate. The foundation includes an oblique lower surface to assure that the sight extends at a discrete angle relative to the base plate when the ornament is secured thereto. Accordingly, if the base plate is mounted on a downwardly-sloped surface, the sight will be substantially vertical.

It is therefore an object of the present invention to a device that assists a driver with maneuvering the front end of a vehicle.

It is another object of the present invention to provide a hood ornament specifically designed for downwardly-sloped vehicle hoods.

Other objects, features, and advantages of the present invention will become readily apparent from the following detailed description of the preferred embodiment when considered with the attached drawings and the appended claims.

DESCRIPTION OF THE PREFERRED EMBODIMENT

Figure 1:
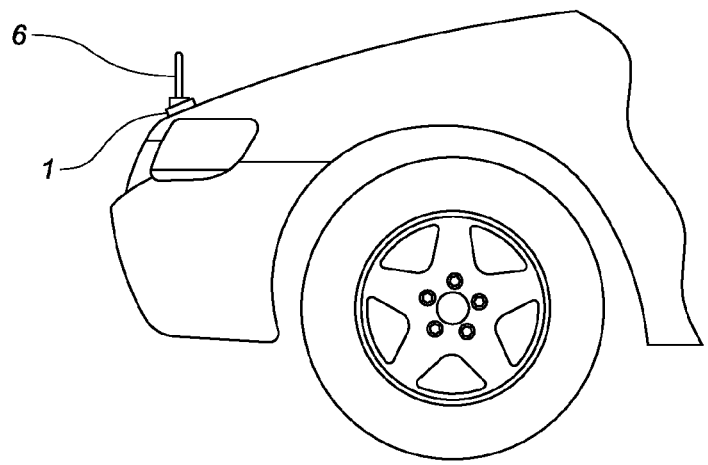
FIG. 1 is a side view of a vehicle with the hood ornament according to the present invention mounted thereon.
Figure 2:
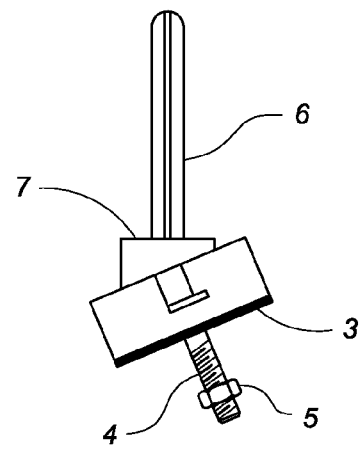
FIG. 2 is an isolated view of the hood ornament.
Figure 3:
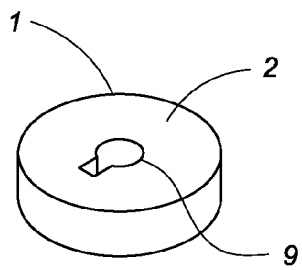
FIG. 3 is an isolated view of the base plate.
Figure 4:
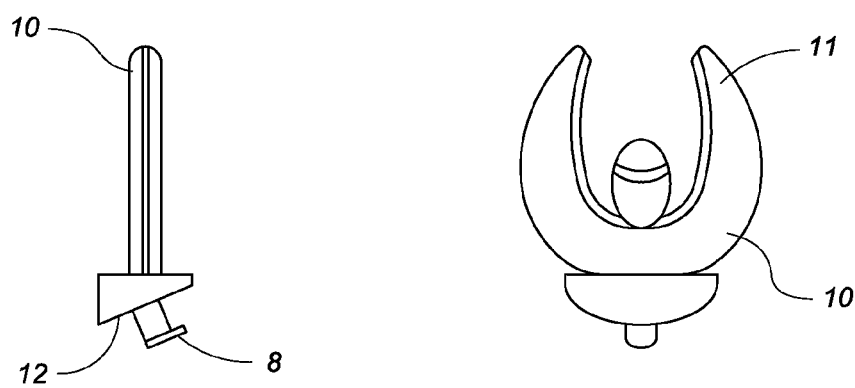
FIG. 4 is a side view of the ornament member.
Figure 5:
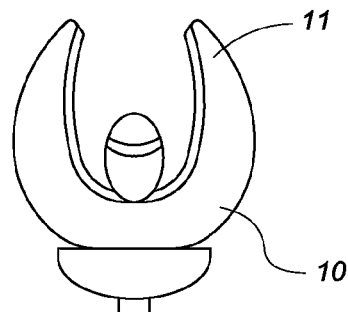
FIG. 5 is a front view of the ornament member.

The present invention relates to a hood ornament comprising a circular base plate 1 having an upper surface 2 and a lower surface 3. Preferably, the lower surface includes a rubber layer to minimize damage to an underlying surface. Extending from the lower surface of the base plate is a bolt 4 that is inserted through a hole formed in the vehicle hood and secured thereto with a locking nut 5. An ornament member 6 includes a foundation 7 having a key latch 8 depending therefrom that releasably seats within a keyed receptacle 9 formed in the upper surface of the base plate. On the upper surface of the foundation is a U-shaped sight 10 having a pair of curved, upright arms 11 that decrease wind resistance. The foundation includes an oblique lower surface 12 to assure that the sight extends at a discrete angle relative to the base plate when the ornament is secured thereto. Accordingly, if the base plate is mounted on a downwardly-sloped surface, the sight will be substantially vertical.

To use the above-described hood ornament, a driver mounts the base plate on a vehicle hood, as close as possible to the front end of the vehicle. When the ornament member is secured to the base plate, the oblique lower surface of the foundation assures that the sight is substantially vertical. The foundation is configured to conform to a discrete vehicle model so as to vertically orient the sight according to the vehicle's hood slope. To prevent theft when the vehicle is parked, the ornament member can be easily removed by rotating it until the latch properly aligns with the keyed receptacle.

The above-described device is not limited to the exact details of construction and enumeration of parts provided herein. Furthermore, the size, shape and materials of construction of the various components can be varied.

Although there has been shown and described the preferred embodiment of the present invention, it will be readily apparent to those skilled in the art that modifications may be made thereto which do not exceed the scope of the appended claims. Therefore, the scope of the invention is only to be limited by the following claims.

The invention claimed is:
1. A hood ornament for a sloped vehicle hood comprising:
a base plate having a planar, horizontal upper surface and a lower surface;
means for fastening said base plate to a vehicle hood;
an ornament member formed of a foundation having a horizontal upper surface and an oblique lower surface with a sight resting on said upper surface, said oblique lower surface resting atop the planar horizontal upper surface of said base plate so that said ornament member extends at an oblique angle relative to said base plate;
means for attaching said foundation to said base plate whereby said sight is substantially vertical when said base plate is mounted on a sloped surface to assist a driver with maneuvering a vehicle, wherein said means for attaching said foundation to said base plate includes a key latch depending from said foundation and a keyed receptacle formed on the upper surface of said base plate for removably receiving said latch.
2. The hood ornament according to claim 1 wherein means for fastening said base plate to a vehicle hood comprises:
a bolt extending from the lower surface of said base plate, said bolt extending through an aperture formed through a vehicle hood;
a locking nut attached to said bolt to tightly anchor the base plate to the hood.
3. The hood ornament according to claim 1 wherein said sight is U-shaped and includes a pair of curved, upright arms for minimizing wind resistance.

* * * * *